United States Patent [19]

Brough

[11] 4,310,169
[45] Jan. 12, 1982

[54] SKI DEVICE FOR SLEDDING

[76] Inventor: Richard G. Brough, 825 Whitemaple Way, Salt Lake City, Utah 84106

[21] Appl. No.: 73,506

[22] Filed: Sep. 7, 1979

[51] Int. Cl.³ .................... B62B 13/00; A63C 5/00
[52] U.S. Cl. .......................... 280/12 K; 280/12 F; 280/601; 296/65 R
[58] Field of Search ............ 280/12 K, 12 KL, 12 R, 280/12 B, 607, 600, 601, 87.01, 18, 19, 12 F; 9/710 A; 296/65 R

[56] References Cited

U.S. PATENT DOCUMENTS

| 2,910,708 | 11/1959 | Albright | 280/18 X |
| 3,026,120 | 3/1962 | Guerard | 280/12 KL |
| 3,301,569 | 1/1967 | Broschart | 280/12 K |
| 4,021,056 | 5/1977 | Oakes | 280/613 |
| 4,199,162 | 4/1980 | Joy | 280/12 K |

FOREIGN PATENT DOCUMENTS

| 487708 | 11/1952 | Canada | 280/12 B |
| 816334 | 4/1937 | France | 280/12 KL |

Primary Examiner—Robert R. Song
Assistant Examiner—Milton L. Smith
Attorney, Agent, or Firm—Jacob H. Steinberg

[57] ABSTRACT

A sled apparatus of the ski type having a single ski upon which there is mounted a form fitting bucket seat fixedly connected to fixed side rails, the rails bearing opposed apertures so that the seat can be located in a proper position fore and aft and a heel stop can also be installed fore and aft for proper riding position.

7 Claims, 3 Drawing Figures

SKI DEVICE FOR SLEDDING

The present invention pertains to a device for sledding by means of a ski and more particularly to an improved ski type sled which is used for transporting an individual over snow covered ground.

Various types of recreational ski type sleds have been known, such as U.S. Pat. Nos. 2,247,182 to Bosca, and 4,114,912 to Sweeney which mount a seat on a single ski but each of these patents includes smaller side runner skis on both left and right sides to improve balance necessitated by locating the seat at too great a height from the surface of the ski.

An object of this invention is to eliminate these side runner skis to reduce their inherent drag and bulk and to substitute therefor a low slung bucket seat that is located directly on the surface of the ski.

Another object is to provide for fore and aft mounting means for the seat and for the heel mount.

Another object is that the fore and aft position can be adjusted to fit different types of snow.

Another object is to provide an improved recreational ski sled having light weight, improved stability, increased strength of construction, and increased stability during use.

Another object is to permit a skier to use his ski skill to balance, turn, and stop, so that his ski sledding is an extension of his knowledge of skiing.

The improved ski sled apparatus of this invention includes a main ski with an upwardly curving main ski tip and a main ski body extending rearwardly thereof. The main ski body has an under surface adapted for contacting a snow covered ground surface and an upper surface for carrying a seat and a heel stop retainer. The seat is of the bucket type formation and is fixedly mounted on the surface of the ski in a fore and aft position determined by the height of the skier and the condition of the snow. A heel rest is also fixed in the proper fore and aft position before it is fixed into position on the ski surface. The bucket seat is provided with a Velcro strap to fasten the skier in the seat. Another Velcro strap is provided to fasten the legs of the skier. A heel stop suitably positioned is provided to serve as a fulcrum point about which the skier can swerve to the left or to the right or sharply to stop.

Various modifications of the improved ski sled apparatus of the present invention are intended to be embodied and will become apparent to those skilled in the art from the teaching of the principles of the invention in connection with the disclosure of the specification, claims and the drawing.

Figure 1:
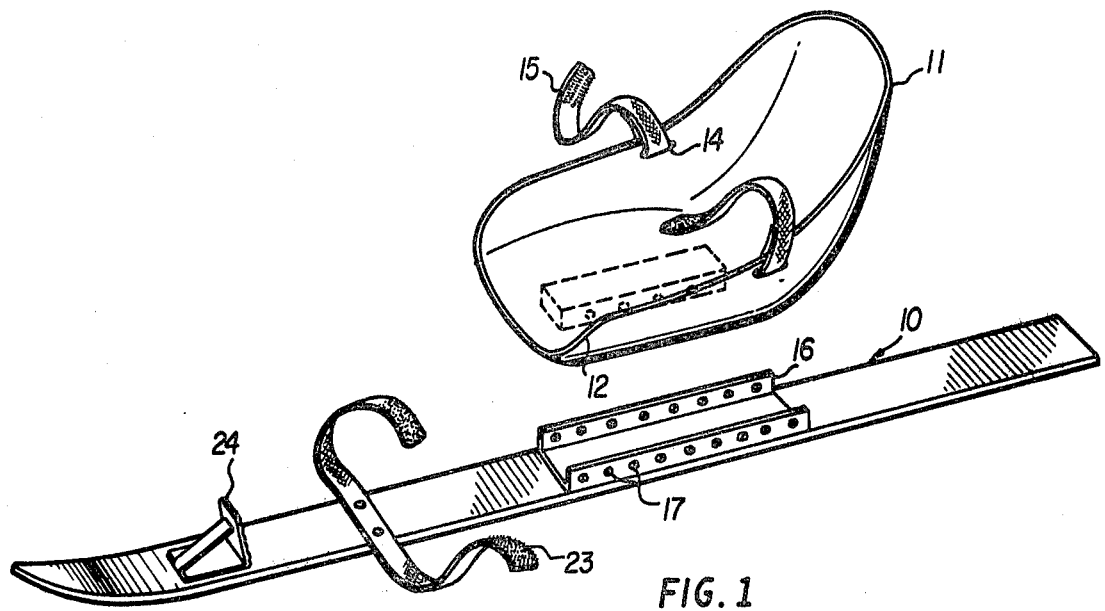
FIG. 1 is a perspective view showing a main ski upon which is mounted a track means with a bucket seat connected thereto, a heel stop and Velcro strap fastening means.
Figure 2:
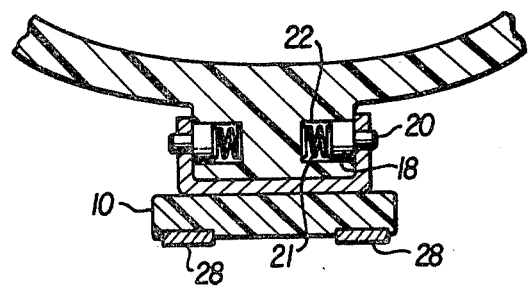
FIG. 2 is a cross-sectional view taken along line 2—2 of FIG. 3 to illustrate one of the metal buttons used to connect the seat to the rail track means.
Figure 3:
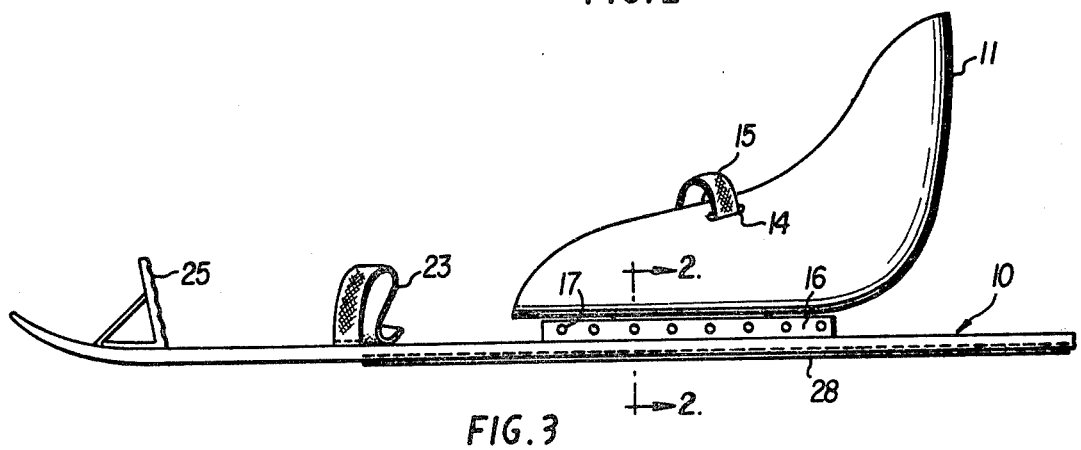
FIG. 3 is a full front face, view, of FIG. 1 showing the construction of the heel stop and the metal reenforcing edges on the underside of the ski.

A form of this invention is now described by way of example only with reference to the accompanying drawing:

A ski device for sledding on snow is shown in FIG. 1. A single conventional ski 10 made of polyurethane resin is about 5 inches wide and about 6 or 7 feet long. A form fitting bucket seat 11 which is also made of polyurethane resin is provided with lipped portions 12 for easy access to said seat, slots 14 through which is threaded Velcro strap 15 for firmly holding the skier in the seat and 4 pairs of opposed apertures along the bottom sides of the seat to be used for connecting the seat to the rail track means 16. The advantage of using a bucket seat that is directly mounted on the surface of the ski is that its low center of gravity reduces the air pressure friction which is ignored by the prior art. The rail track means contains 8 or more opposed pairs of apertures 17. This rail track means is made of metal alloy and is screw fastened to the surface of the ski. The seat is located in the proper fore and aft position on the rail track means dependent on the height of the skier and the type of snow on which the ski sled is being used. For powder snow, the seat should be fastened to the aft or rear position as far as possible and for hard packed snow, the seat should be fastened forwardly over the central position of the ski sled. Once the exact position for the seat has been determined the four pairs of apertures in the seat bottom sides are aligned with the corresponding apertures in the rail track means, and fastening metal button means 18 are inserted through said aligned apertures. The fastening buttons are shown in FIG. 2 wherein the main body 18 of each button has a reduced end 20 with a spring 21 located behind it. The apertures in the seat bottom are slightly larger than the apertures of the rail tracks, spring 21 is inserted in the larger aperture 22 of the seat bottom and exerts pressure against button 18 urging its reduced shoulder 20 to press through the aligned smaller aperture firmly locking the seat to the rail track. The use of such a fastening means assures a firm binding means for connecting the seat to the rail track means. A second Velcro strap 23 is located on the surface of the ski in a proper location for binding the legs of the skier. The heel stop 24 is similarly located in the proper fore and aft position dependent upon the height of the skier and the condition of the snow surface. It is made of metal and is screw fastened to the ski surface. As shown in FIG. 3 the heel stop is 3 to 4 inches wide and is tapered relative to its base, being about 3 inches high in front and tapering to 2 inches towards the rear. Its front face is roughened with small serrations 25 to prevent slippage.

In addition, to reenforce the ski sled metal edge strips 28 are provided on the underside outside edges of the ski sled from a position beyond strap 23 to a position beyond the rail track means but short of the end of the ski sled body.

It is important to point out the advantages of the ski sled of this invention:

1. There is adjustability in the fore and aft positions depending on the height of the rider both for the seat and the heel stop and for the condition of the snow surface.

2. The use of a form fitting bucket seat that is low slung when mounted results in a lower center of gravity which reduces the air pressure friction when the ski sled is in use.

3. The use of Velcro binding straps, one to firmly fasten the rider to the seat and the other to fasten his legs assures maintenance of the low center of gravity. By using the right amount of Velcro straps, a safety factor is added because they will release in case of a crash so as to permit the rider to separate from the ski sled and thus reduce the chance of injury.

4. The use of a roughened surface on the heel stop assures a firm hold against displacement of the rider's legs.

5. The rider for the first time is able to use his skiing skills on the ski sled to turn left or right and to stop.

6. The metal reenforcing strips at the edges of the ski sled insure additional strength and safety to the ski sled.

Although each of the ski sled elements could be made of metal, metal alloy, rigid or resilient plastics, or wood, in the preferred materials, both the seat and the ski are made of polyurethane resin while the rail track, holding buttons, the heel stop, and reenforcing of side edges of the ski are made of light metal or metal alloy material.

It is understood that while one preferred embodiment of the present invention has been illustrated and described herein, numerous variations or modifications therein may occur to those having skill in this art and what is intended to be covered herein is not only the illustrated form of the invention, but also any and all modified forms thereof as may come within the spirit of said invention.

What is claimed is:

1. A sledding ski including both a seat and a foot rest wherein
   (a) opposed track means extend the width of the ski on the rear portion of said ski beyond its medial length, and
   (b) wherein said track means has vertically extended edge portions containing a series of equidistant aligned opposed openings, and
   (c) a bucket seat sitting directly on said track means and being provided on its underside with spring urged shoulder button means engageable in said openings as a stop means for locating the seat in accordance with the height of a user, and
   (d) strap means threaded thru opposed slits located in the sides of said seat to cross over the abdomen of a user, and
   (e) heel stop means located at the forward end of the ski, and
   (f) strap means intermediately located between said seat and said foot rest to bind the legs of a user.

2. The device of claim 1 wherein the retaining straps are bound with Velcro.

3. The device of claim 1 wherein the seat is provided with lipped portions forwardly of said seat for easy access by a rider.

4. The device of claim 1 wherein said heel stop is roughened to avoid slippage.

5. The device of claim 1 wherein metal reenforcing strips are provided on opposed outer edges of said ski body.

6. The device of claim 1 wherein its structure is made of wood.

7. The device of claim 1 wherein its structure is made of thermoplastic and thermosetting resins.

* * * * *